(12) United States Patent
Jung et al.

(10) Patent No.: US 8,634,548 B2
(45) Date of Patent: Jan. 21, 2014

(54) FREE-STOP HINGE APPARATUS FOR FOLDING-TYPE MOBILE PHONE

(75) Inventors: Young-Jun Jung, Daegu (KR); Hae-Won Sung, Gyeongsangbuk-do (KR); Sung-Sun Park, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 357 days.

(21) Appl. No.: 12/908,981

(22) Filed: Oct. 21, 2010

(65) Prior Publication Data

US 2011/0165921 A1    Jul. 7, 2011

(30) Foreign Application Priority Data

Jan. 6, 2010   (KR) .................. 10-2010-0000746

(51) Int. Cl.
*H04M 1/00* (2006.01)
*H04M 9/00* (2006.01)
*E05F 1/08* (2006.01)

(52) U.S. Cl.
USPC ............ 379/433.13; 16/221; 16/296; 16/303; 16/330; 361/679.27; 361/679.28; 361/726; 379/433.11; 455/575.3

(58) Field of Classification Search
USPC ............... 16/303, 324, 330, 53, 60, 221, 233, 16/234, 241, 270, 296; 312/7.1, 7.2, 9.1, 312/9.4, 9.8, 9.14, 9.15, 223.2, 223.4; 345/905; 348/789, 836; 379/428.01, 379/440, 433.01, 433.12, 433.13; 455/90.3, 455/347, 575.1, 575.3, 575.4, 575.8, 56.1, 455/556.2, 573.5; 361/679.26, 679.27, 361/679.28, 724, 726, 727
See application file for complete search history.

(56) References Cited

U.S. PATENT DOCUMENTS

| | | | | |
|---|---|---|---|---|
| 6,470,175 | B1 * | 10/2002 | Park et al. .................. | 455/90.1 |
| 6,772,481 | B2 * | 8/2004 | Oshima et al. ............... | 16/330 |
| 6,862,779 | B1 * | 3/2005 | Lu et al. ...................... | 16/340 |
| 7,184,275 | B2 * | 2/2007 | Yamaguchi et al. .......... | 361/755 |
| 7,203,995 | B2 * | 4/2007 | Hsu et al. ..................... | 16/330 |
| 7,287,302 | B2 * | 10/2007 | Park et al. .................... | 16/330 |
| 7,484,268 | B2 * | 2/2009 | Kim et al. .................... | 16/330 |
| 7,631,398 | B1 * | 12/2009 | Lin .............................. | 16/341 |
| 8,286,307 | B2 * | 10/2012 | Cheng et al. ................. | 16/330 |
| 2007/0039132 | A1 * | 2/2007 | Jung et al. .................... | 16/325 |
| 2007/0039133 | A1 * | 2/2007 | Kim ............................ | 16/325 |
| 2009/0100641 | A1 * | 4/2009 | Yang ........................... | 16/303 |

* cited by examiner

*Primary Examiner* — Anthony Addy
*Assistant Examiner* — Michael S Bush
(74) *Attorney, Agent, or Firm* — Cha & Reiter, LLC

(57) ABSTRACT

A free-stop hinge apparatus employed in a folding-type mobile terminal preferably includes: a hinge housing; a driving part for providing a free-stop operation, which is received in the hinge housing. A hinge shaft restrains the driving part in the hinge housing, and the driving part includes a rotating driving actuating cam and a driven sliding cam slides according to rotation of the driving actuating cam. The driving actuating cam includes an inner cam formed on one surface of a body, and an outer cam confronting the inner cam, and the driven sliding cam includes an inner valley which is disposed to confront the inner cam and slides together with the inner cam, and an outer valley which is disposed to confront the outer cam and slides together with the outer cam.

16 Claims, 9 Drawing Sheets

FREE-STOP HINGE APPARATUS FOR FOLDING-TYPE MOBILE PHONE

CLAIM OF PRIORITY

This application claims priority from application entitled "Free-Stop Hinge Apparatus For Folding-type Mobile Phone" filed with the Korean Intellectual Property Office on Jan. 6, 2010 and assigned Serial No. 10-2010-0000746, the contents of which are incorporated herein by reference in its entirety.

BACKGROUND OF THE INVENTION

1. Field of the Invention

The present invention relates to a hinge apparatus for a mobile terminal, including a cellular phone, a smart phone. More particularly, the present invention relates to a free-stop hinge apparatus for a folding-type mobile terminal for providing a stopping force when the folder is closed and opened.

2. Description of the Related Art

Generally, a mobile terminal is a broad term that includes devices such as a notebook computer, a PDA, a radiotelegraph, an MP3 player, a PMP, a cellular phone, a smart phone, and the like. From among such mobile terminals, a cellular phone or a smart phone, in order to be commercially successful, has to have a light-weight and be small-sized for the convenience of carrying. Especially, as a multimedia environment has been grown, items such as image communication, games, customized videos, TV-watching, and the like as well as simple voice communication or short message transmission, are now fairly common for most new mobile terminals. Thus, mobile terminals have been developed into devices in which multimedia contents can be conveniently watched in more modes.

Commonly used mobile terminals mainly include bar-type, folding-type, and sliding-type mobile terminals. In particular, the folding-type mobile terminal is mounted with a hinge apparatus for rotatably connecting a main body to a folder. A hinge apparatus employed in a folding-type mobile terminal, such as a cellular phone, is a semi-automatic hinge apparatus, and includes a hinge shaft, a hinge cam, a hinge spring, and a housing for receiving these components.

In the above mentioned semi-automatic hinge apparatus, a main body is rotatably connected to a folder by the hinge apparatus. Thus, the hinge apparatus provides a driving force for semi-automatically opening/closing the folder. In other words, the semi-automatic hinge apparatus provides to the main body: (1) a force for closing the folder toward the main body within a range of about 0~10°; (2) a force for opening the folder within a range of about 10~170°; and (3) a force for stopping the folder within about 170°.

In FIG. 1, a folding-type mobile terminal is shown. As shown in FIG. 1, the folding-type mobile terminal includes a main body 10, a folder 20, and a hinge apparatus 30. The hinge apparatus 30 semi-automatically opens and closes the folder 20 by rotatably connecting the folder 20 to the main body 10. Typically, in an inner surface of the main body 10 includes a keypad 100 including multiple keys, and in an inner surface of the folder 20 includes a display unit (not shown) and a speaker device.

The hinge apparatus 30 includes a hinge dummy (not shown), a hinge module (denoted by 35, in FIG. 2), and a plurality of hinge arms. The hinge arms include a couple of side hinge arms 110 and 112, and a center hinge arm 210, which is disposed between the side hinge arms 110 and 112, and is coupled to the side hinge arms 110 and 112 by the hinge apparatus. The hinge apparatus 30 includes one hinge dummy, and one hinge module 35, and the hinge dummy (not shown) and the hinge module 35 are embedded in the center hinge arm 210. In FIG. 1, a hole 113 formed in one side hinge arm 112 is shown in an exposed state. Through the hole, a part of a shaft portion 342 of a driving cam of the hinge module can be coupled with a shaft portion of the hinge dummy (not shown).

In FIG. 2, the hinge module 35 for the folding-type mobile terminal is shown. As shown in FIGS. 2 to 3c, the conventional hinge module 35 receives, within a hinge housing 310, a driving cam 340, a driven cam 350, a hinge spring 320, and a hinge shaft 330, which will be described later. The hinge spring 320 provides a force for tightly fitting the driving cam 340 in the driven cam 350, and the hinge shaft 330 restrains the driving cam 340, the driven cam 350, and the hinge spring 320 in the hinge housing 310.

FIGS. 4a and 4b show driving parts for such a conventional hinge module discussed herein above, specifically, the driving cam 340 and the driven cam 350, respectively. The driving cam 340 and the driven cam 350, shown in the drawings, provide a stopping force to the folder at about 180°.

As shown in FIG. 4a, the driving cam 340 comprises a member which is disposed to face the driven cam 350 and performs a cam motion to engage with the driven cam 350, and includes a couple of mountain-shaped protrusions 343 and 344. Each of the mountain-shaped protrusions 343 and 344 protrudes from a main body 341 of the driving cam in the direction of the hinge axis. Between the couple of protrusions 343 and 344 are a naturally formed couple of groove-shaped valley portions 345 and 346.

As shown in FIG. 4b, in the driven cam 350, a couple of mountain portions 352, 353 and valley portions 354 and 355, (i.e. groove-shaped recesses), are formed. The valley portions 354 and 355 are engaged with the protrusions 343 and 344. When the protrusions 343 and 344 engage with the valley portions 354 and 355, a stopping force is provided to the folder. The diagram of the open/close operation of the hinge apparatus is shown in FIG. 5.

However, the above-described driving part of the hinge apparatus for the mobile terminal includes a couple of protrusions and a couple of valley portions, and provides a stopping motion of the folder at about 180°. Thus, a stopping force cannot be provided except when the folder is closed and opened. In other words, in the folding-type mobile terminal, the folder cannot be stopped except when being in a closed state and in an opened state, that is, at two positions (about 0° and 180°). This causes inconvenience in the use in various modes of a mobile terminal because the folder can only be stopped at the aforementioned positions.

Especially, the viewing-convenience of a multimedia environment currently favors the convenience to operate keys and to watch the data displayed on the display unit. From the point of view of a user, various angles are required to watch the data displayed on the display unit.

A hinge apparatus that provides a force for stopping the folder at various angles is called a free-stop hinge apparatus.

A driving cam and a driven cam of such a conventional free-stop hinge apparatus are shown in FIGS. 6a and 6b, respectively.

Referring now to FIGS. 6a and 6b, a driving cam 360 for the conventional free-stop hinge apparatus includes a single protrusion 362 and a flat portion 361, and a driven cam 370 includes a flat surface 371 a single valley portion 372. The protrusion 362 of the driving cam 360 performs a cam motion by engaging with the valley portion 372 of the driven cam 370. Such a hinge apparatus has a structure to provide a force for stopping the folder at about 0° or 360°. The diagram of the open/close operation of the conventional hinge apparatus employing the driving cam 360 and the driven cam 370 is shown in FIG. 7.

However, in the above described free-stop hinge apparatus, the cam motion is unstable, thereby making the open/close operation of the folder unstable. The single protrusion of the driving part, and the single valley portion performing a cam motion by engaging with the single protrusion cause an unstable open/close operation of the hinge apparatus through an out-of-balance cam motion according to the open/close of the folder. This state gradually imposes an excessive stress on the arms and a hinge module of the hinge apparatus, thereby causing a crack.

SUMMARY OF THE INVENTION

Accordingly, the present invention has been made to provide a free-stop hinge apparatus for a mobile terminal, which is convenient to use because step states of a folder can be effectively achieved at various angles.

Furthermore, the present invention provides a free-stop hinge apparatus for a mobile terminal, which provides for a stable open/close operation of a folder.

In accordance with an exemplary aspect of the present invention, there is provided a free-stop hinge apparatus for a folding-type mobile terminal, in which a main body and a folder are rotatably connected to each other on a hinge axis, the free-stop hinge apparatus including: a hinge housing; a driving part for providing a free-stop operation, which is received in the hinge housing; and a hinge shaft for restraining the driving part in the hinge housing, wherein the driving part includes a rotating driving actuating cam and a driven sliding cam which slides according to rotation of the driving actuating cam, wherein the driving actuating cam includes an inner cam formed on one surface of a body, and an outer cam which confronts the inner cam and is formed at an outer position than the inner cam in a radial direction, and the driven sliding cam includes an inner valley which is disposed to confront the inner cam and slides together with the inner cam, and an outer valley which is disposed to confront the outer cam and slides together with the outer cam.

In accordance with another exemplary aspect of the present invention, there is provided a free-stop hinge apparatus for a folding-type mobile terminal, in which a main body and a folder are rotatably connected to each other on a hinge axis, the free-stop hinge apparatus including: a rotating driving actuating cam; and a driven sliding cam which slides according to a rotation of the driving actuating cam, wherein the driving actuating cam has an inner cam and an outer cam, and has a hinge hole at a center thereof, the hinge hole extending in a direction of the hinge axis, wherein the inner cam is formed on one surface of a body, and the outer cam confronts the inner cam and is formed at an outer position than the inner cam in a radial direction, and the driven sliding cam has an inner valley and an outer valley, and a hinge hole at a center thereof, the hinge hole extending in a direction of the hinge axis, wherein inner valley confronts the inner cam and the outer valley confronts the outer cam.

In accordance with a further exemplary aspect of the present invention, there is provided a free-stop hinge apparatus for a folding-type mobile terminal, in which a main body and a folder are rotatably connected to each other on a hinge axis, the free-stop hinge apparatus including: a rotating driving actuating cam; and a driven sliding cam which slides according to a rotation of the driving actuating cam, wherein the driving actuating cam includes an inner cam formed on one surface of a body, and an outer cam which confronts the inner cam and is formed at an outer position than the inner cam in a radial direction, and the driven sliding cam includes an inner valley which is disposed to confront the inner cam and slides together with the inner cam, an outer valley which is disposed to confront the outer cam and slides together with the outer cam, an inner projection part which takes a stepped shape recessed in a direction of the hinge axis and is formed at a position confronting the inner valley, and an outer projection part which has a stepped shape recessed in a direction of the hinge axis and formed at a position confronting the outer valley.

BRIEF DESCRIPTION OF THE DRAWINGS

The above and other exemplary features, aspects, and advantages of the present invention will become more apparent from the following detailed description taken in conjunction with the accompanying drawings, in which.

DETAILED DESCRIPTION

Hereinafter, the configuration of a free-stop hinge apparatus employed in a folding-type mobile terminal according to the present invention will be described in detail with reference to the accompanying drawings. In the following description of the present invention, the same or corresponding parts will be denoted by the same numerals.

Figure 1:
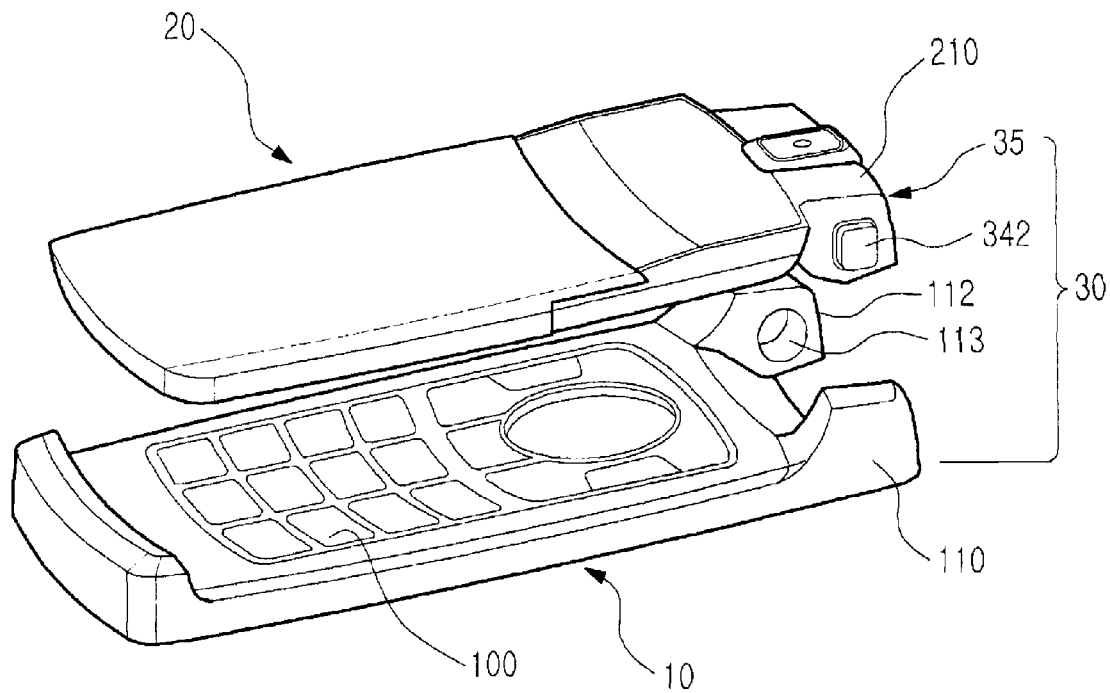
FIG. 1 is an exploded perspective view showing a folding-type mobile terminal.
Figure 2:
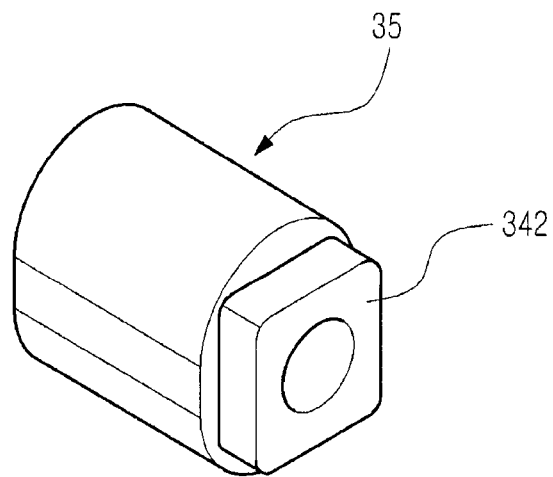
FIG. 2 is a perspective view showing the exterior of a conventional assembled hinge module for a folding-type mobile terminal.
Figure 3A:
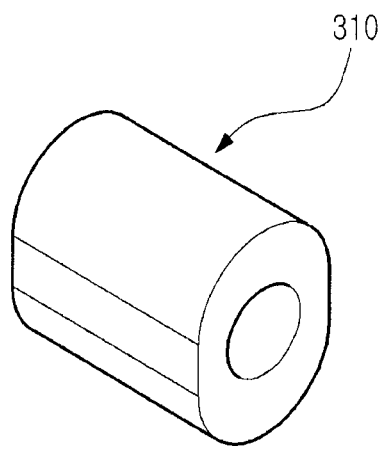
FIG. 3a is a perspective view showing a hinge housing for a conventional hinge module.
Figure 3B:
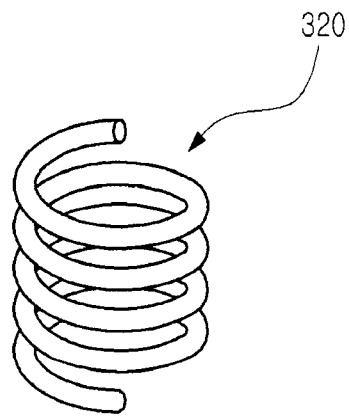
FIG. 3b is a perspective view showing a hinge spring for a conventional hinge module.
Figure 3C:
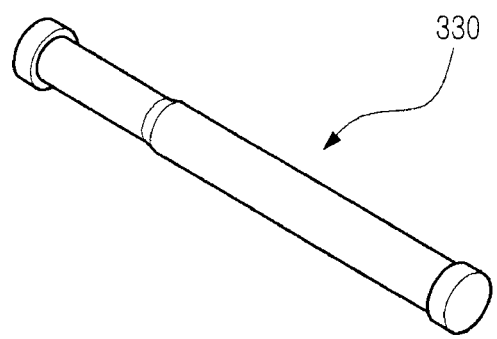
FIG. 3c is a perspective view showing a hinge shaft for a conventional hinge module.
Figure 4A:
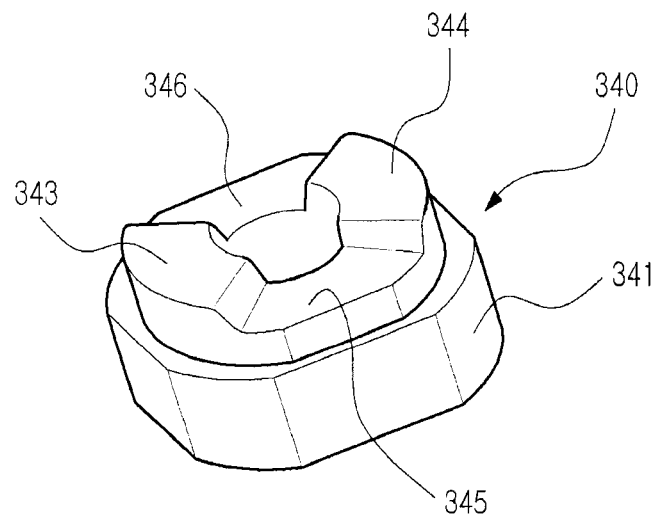
FIG. 4a is a perspective view showing a driving cam for a conventional hinge module, according to a conventional first exemplary embodiment.
Figure 4B:
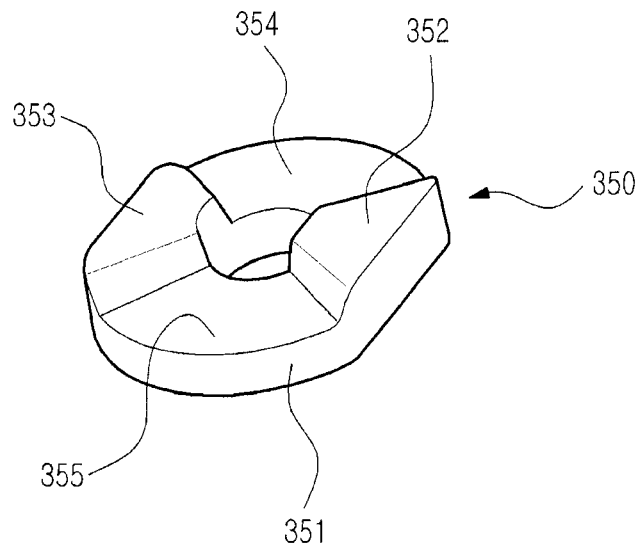
FIG. 4b is a perspective view showing a driven cam for a conventional hinge module, according to a first conventional exemplary embodiment.
Figure 5:
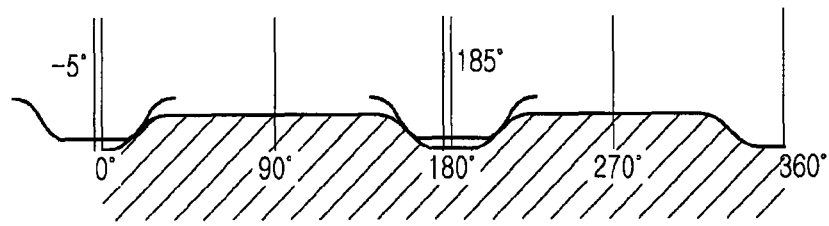
FIG. 5 is a diagram showing a click feeling at 180° in a mobile terminal employing a hinge module according to the first conventional exemplary embodiment, in which the horizontal axis indicates the unfolded state of valley portions, and the vertical axis indicates the rotation angle.
Figure 6A:
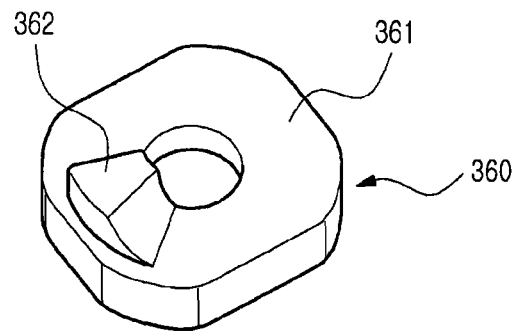
FIG. 6a is a perspective view showing a driving cam for a conventional hinge module, according to a second conventional exemplary embodiment.
Figure 6B:
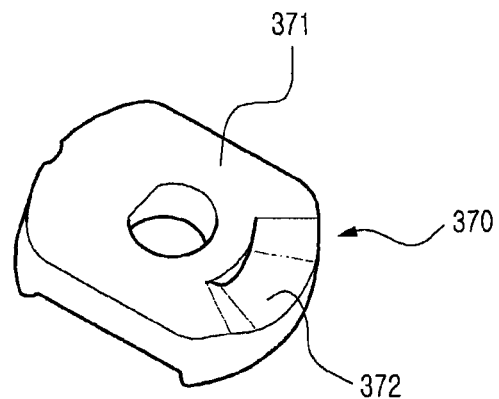
FIG. 6b is a perspective view showing a driven cam for a conventional hinge module, according to a second conventional exemplary embodiment.
Figure 7:
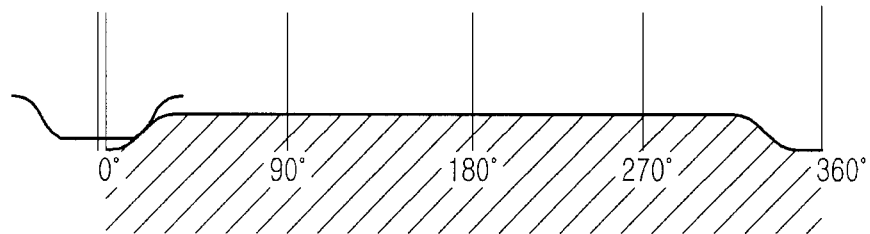
FIG. 7 is a diagram showing a free-top state in a mobile terminal employing a hinge module according to a second conventional exemplary embodiment, in which the horizontal axis indicates the unfolded state of valley portions, and the vertical axis indicates the rotation angle.
Figure 8:
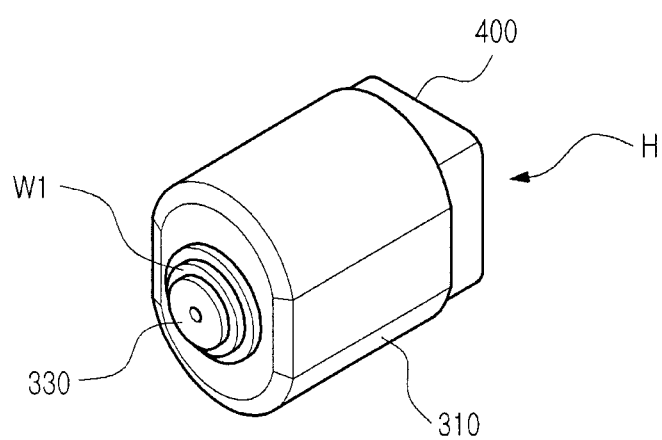
FIG. 8 is a perspective view showing the exterior of a hinge module according an exemplary aspect of the present invention.

As shown in FIG. 8, in a hinge module "H" employing a driving actuating cam 40 (shown in FIG. 10) and a driven sliding cam 50 (shown in FIG. 11) according to an exemplary embodiment the present invention, the end of a hinge shaft 330 is exposed to a first lateral surface of a hinge housing 310, and a shaft portion 400 of the driving actuating cam is exposed to a second lateral surface of the hinge housing. The shaft portion 400 is configured to be coupled with a side hinge arm. In the hinge housing 310, a driving part and the hinge shaft 330 for restraining the driving part in the hinge housing 310 are received. The above-mentioned driving part includes the driving actuating cam, and the driven sliding cam that will be described later.

Figure 9:
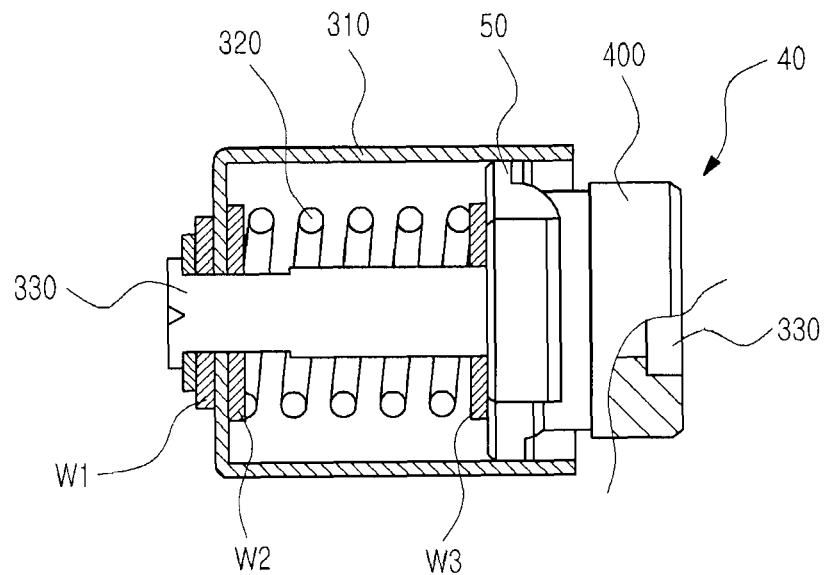
FIG. 9 is a cross-sectional view showing the exemplary configuration of a hinge module according to the present invention.

As shown in FIG. 9, the hinge module H according to the present invention includes the driving actuating cam 40, the driven sliding cam 50, a hinge spring 320, and the hinge shaft 330. Herein, the hinge shaft 330 is penetratively disposed through these parts, thereby restraining the driving actuating cam 40, the driven sliding cam 50, a hinge spring 320 within the hinge housing 310 based on a first lateral surface of the hinge housing 310. The shaft portion 400 of the driving actuating cam 40 is disposed to the outside of the hinge housing 310. The hinge spring 320 provides a force for tightly fitting the driving actuating cam 40 with the driven sliding cam 50. When the driving actuating cam 40 rotates according to the rotation of the folder, the driven sliding cam 50 slidingly moves within the hinge housing 310 while performing a cam-motion with the driving actuating cam 40. Naturally, the hinge spring 320 contracts or extends within the hinge housing 310. Reference numerals w1, w2, and w3 denote ring-shaped washers.

Hereinafter, the configuration of a driving part for a hinge module of a hinge apparatus according to a first exemplary embodiment of the present invention, i.e. a driving actuating cam 40 and a driven sliding cam 50, will be described with reference to FIGS. 10 and 11.

Figure 10:
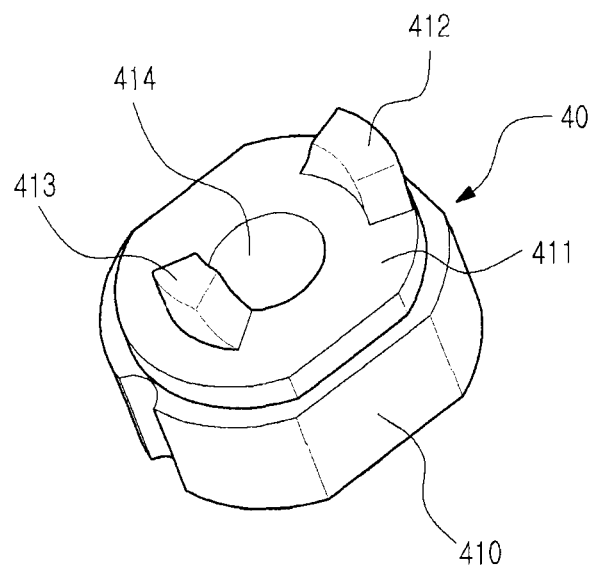
FIG. 10 is a perspective view showing a driving actuating cam for a hinge module according to a first exemplary embodiment of the present invention.
Figure 11:
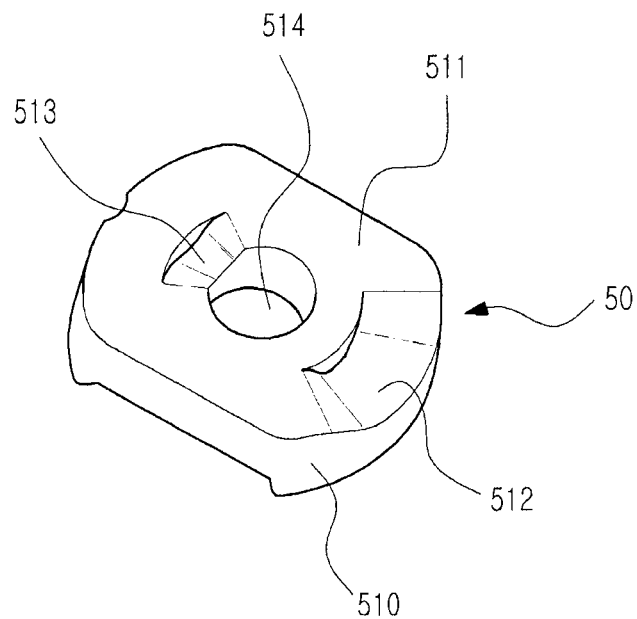
FIG. 11 is a perspective view showing a driven sliding cam for a hinge module according to a first exemplary embodiment of the present invention.

The driving part of the hinge apparatus, shown in FIGS. 10 and 11, preferably includes two cams functioning as a free-stop hinge, and specifically includes a driving actuating cam 40 and a driven sliding cam 50.

The free-stop hinge apparatus is a hinge apparatus, which does not provide a stopping force at 180° during the open/close operation of the folder. In other words, the stopping force from the hinge apparatus is not provided to the folder except at 0° and 360°.

The driving actuating cam 40 is a rotating cam, and the driven sliding cam 50 is a sliding cam. The driving actuating cam 40 and the driven sliding cam 50 cam in a state where their cam surfaces face each other, thereby supporting the folder in a stopped state. Naturally, through the camming action, a hinge spring provides a force for tightly fitting the cam surfaces against each other. Such a tightly fitting force is converted into the camming action between the driving actuating cam 40 and the driven sliding cam 50. Specifically, the force is converted into the driving actuating cam 40's rotating movement together with the rotation of the folder, and into the driven sliding cam 50's sliding movement within the hinge housing according to the rotation movement of the driving actuating cam 40.

As shown in FIG. 10, the driving actuating cam 40 for the hinge module according to the first exemplary embodiment of the present invention includes a body 410, an inner cam 413 provided to one surface 411 of the body 410, and an outer cam 412 which confronts the inner cam 413 and is formed closer to an outer position (outer edge) of the surface 411 than the inner cam 413 from a hinge hole 414. Herein, the inner cam 413 has a small inside diameter based on the hinge hole 414, and the outer cam 412 has a relatively large inside diameter compared to the inner cam.

The driving actuating cam 40 typically has the hinge hole 414 at the center therein. The hinge hole allows the hinge shaft to be inserted therethrough, and extends in the direction of the hinge axis. The inner cam 413 has a mountain-shaped protrusion and protrudes in a direction from the one surface 411 of the body of the driving actuating cam in the direction of the hinge axis. The mountain shape indicates that the inner cam includes an upward slant sliding surface, a downward slant sliding surface, and a flat sliding surface.

Still referring to FIG. 10, the inner cam 413 and the outer cam 412 confront and face each other on opposite ends of the hinge hole 414 at about 180° therebetween. The inner cam 413 is close to the hinge hole 414, and the outer cam 412 is positioned radially farther away from the hinge hole than the inner cam 413. The outer cam 412 has a mountain-shaped protrusion, and protrudes from the one surface of the body 410 of the driving actuating cam in a direction of the hinge axis. The mountain shape indicates that the inner cam includes an upward slant sliding surface, a downward slant sliding surface, and a flat sliding surface. Preferably, the mountain shape of the outer cam 412 is formed to be larger than the inner cam 413. The reason for the outer cam being larger is because the outer cam 412 is positioned farther away from the hinge hole 414 than the inner cam 413, and the curvature of the outer cam 412 is larger than that of the inner cam 413.

As shown in FIG. 11, the driven sliding cam 50 includes a body 510 and has a hinge hole 514 at the center thereof, and inner and outer valleys 513 and 512 for camming together with the driving actuating cam 40. The inner valley 513 corresponds to the shape of the inner cam 413, and the outer valley 512 corresponds to the shape of the outer cam 412. The inner valley 513 confronts the outer valley 512, and specifically is formed at a position of confronting the outer valley 512 at about 180°. The inner valley 513 is formed at a position closer to the hinge hole 514, and the outer valley 512 is formed farther away from the hinge hole 514 than the inner valley 513.

Also, the inner valley 513 includes a groove-shaped downward slant sliding surface, and an upward slant sliding surface. The outer valley 512 includes a downward slant sliding surface, and an upward slant sliding surface. The inner valley 513 is positioned closer to the hinge hole 514 than the outer valley 512 that is positioned radially farther away from the hinge hole than the inner valley 513. Preferably, the valley shape of the outer valley 512 is formed to be larger than the inner valley 513. The reason that the outer valley 512 preferably is formed to be larger than the inner valley 51 is because the curvature of the outer valley 512 is larger than that of the inner valley 513.

Hereinafter, the camming between the driving actuating cam 40 and the driven sliding cam 50 will be described.

The driving actuating cam 40 and the driven sliding cam 50 are mounted within the hinge housing while they face each other. Herein, in a state where the mobile terminal is closed, i.e., in a state where the folder is unfolded from the main body, the inner and outer cams 413 and 412 are engaged with the inner and outer valleys 513 and 512, respectively. This force is a stopping force of the folder. Accordingly, the unfolded state of the folder can be maintained without opening the folder from the main body.

Then, when the folder rotates, the inner and outer cams 413 and 412 are disposed to face the inner and outer valleys 513 and 512 cam while performing surface-contact.

When the driving actuating cam 40 rotates at 10° or more, the outer cam 412 moves to a sliding flat surface 511 by separating from the outer valley 512, and at the same time the inner cam 413 moves to the sliding flat surface by separating from the inner valley 513. At the same time, the driven sliding cam 50 moves backward within the hinge housing. In this state, to the folder, a force for maintaining the current position of the folder is provided, instead of a force for rotating the folder. Then, when the driving actuating cam 40 rotates at 180°, the outer cam 412 is positioned at the sliding flat surface 511, and the inner cam 413 is positioned at the sliding flat surface 511. In this case, to the folder, a force is provided for maintaining the current position of the folder, rather than a force for rotating the folder. Finally, the driving actuating cam 40 and the driven sliding cam 50 provide a stopping force to the folder at about 360°.

In other words, in this exemplary embodiment of the present invention, the camming between the driving actuating cam and the driven sliding cam, the camming between the inner and outer cams and the inner and outer valleys provides a stopping force at angles of 0~10°, and 350~360° of the open/close operation of the folder, and provides a slight maintaining force for maintaining the folder instead of the stopping force that is provided at other rotation angles.

Hereinafter, with reference to FIGS. 12 and 13, the configuration of a driving part for a hinge module according to a second exemplary embodiment of the present invention, that is, a driving actuating cam 60 and a driven sliding cam 70, will now be described.

Figure 12:
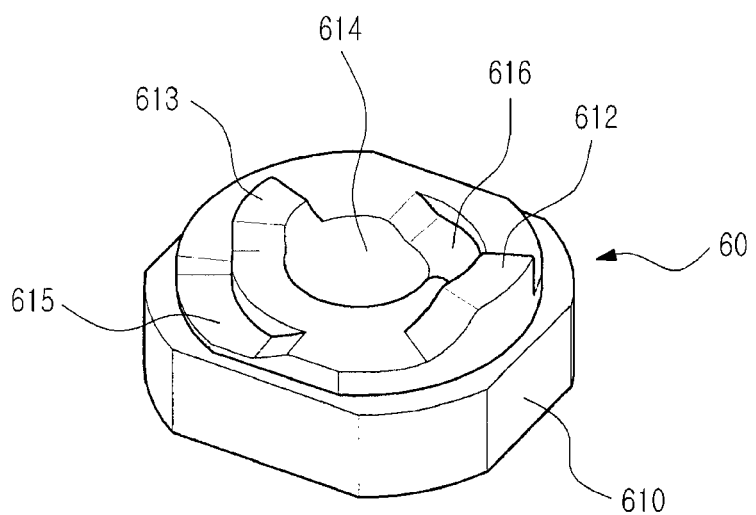
FIG. 12 is a perspective view showing a driving actuating cam for a hinge module according to a second exemplary embodiment of the present invention.
Figure 13:
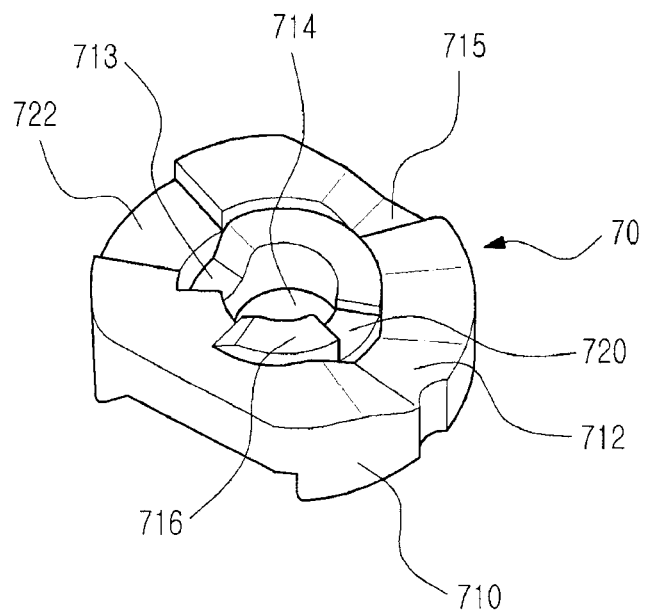
FIG. 13 is a perspective view showing a driven sliding cam for a hinge module according to a second exemplary embodiment of the present invention.

The driving part of the hinge module, shown in FIGS. 12 and 13, includes two cams, and specifically includes a driving actuating cam 60 and a driven sliding cam 70. The driving actuating cam 60 is a rotating cam that rotates within the hinge housing, and the driven sliding cam 70 is a sliding cam that slides within the hinge housing. The driving actuating cam 60 and the driven sliding cam 70, according to the second exemplary embodiment of the present invention, cam together in a state where their cam surfaces face each other, thereby supporting the folder in a stopped state (at about 0°, 180°, and 270°).

With continued reference to FIGS. 12 and 13, through the camming, a hinge spring provides a force for tightly fitting the cam surfaces against each other. Such a tightly fitting force is converted into the camming action between the driving actuating cam 60 and the driven sliding cam 70. Specifically, the force is converted into the driving actuating cam 60's rotating movement together with the rotation of the folder, and into the driven sliding cam 70's sliding movement within the hinge housing according to the rotation movement of the driving actuating cam 60.

As shown in FIG. 12, the driving actuating cam 60 for the hinge module according to the second exemplary embodiment of the present invention preferably includes a body 610, an inner cam 613 provided to one surface of the body 610, and an outer cam 612 which confronts the inner cam 613 on the opposite position of the hinge hole 614 and is formed at an outer position relative to the position or the inner cam 613 from the hinge hole 614 in a radial direction. The driving actuating cam 60 has the hinge hole 614 at the center therein. The hinge hole allows the hinge shaft to be inserted therethrough, and the hinge shaft extends in the direction of the hinge axis. The inner cam 613 has a mountain-shaped protrusion and protrudes from the one surface of the body 610 of the driving actuating cam in a direction of the hinge axis. The mountain shape indicates that the inner cam includes an upward slant sliding surface, a downward slant sliding surface, and a flat sliding surface.

Still referring to FIG. 12, the inner cam 613 and the outer cam 612 confront and face each other on the opposite side of the hinge hole 614 at about 180° therebetween. The outer cam 612 is positioned radially farther away from the hinge hole than the inner cam 613. The outer cam 612 has a mountain-shaped protrusion, and protrudes from the one surface of the body 610 of the driving actuating cam in a direction of the hinge axis. The mountain shape indicates that the inner cam includes an upward slant sliding surface, a downward slant sliding surface, and a flat sliding surface. Preferably, the mountain shape of the outer cam 612 is formed to be larger than a size of the inner cam 613. The reason that the outer cam 612 is preferably larger than the inner cam 613 is because the outer cam 612 is positioned farther away from the hinge hole 614 than the inner cam 613, and the curvature of the outer cam 612 is larger than that of the inner cam 613.

Also, the driving actuating cam 60 includes an inner valley 616 in a curvature area included in the rotation of the inner cam 613, and an outer valley 615 in a curvature area included in the rotation of the outer cam 612.

As shown in FIG. 13, the driven sliding cam 70 includes a body 170 and has a hinge hole 714 at the center thereof, and inner and outer valleys 713 and 712 for camming together with the driving actuating cam 60. The inner valley 713 and the outer valley 712 are recessed in a direction of the hinge axis. The inner valley 713 corresponds to the shape of the inner cam 613, and the outer valley 712 corresponds to the shape of the outer cam 612. The inner valley 713 confronts the outer valley 712, and specifically is formed at a position of confronting the outer valley at about 180°.

With continued reference to FIG. 13, the inner valley 713 includes a downward slant sliding surface, and an upward slant sliding surface. Also, the outer valley 712 includes a downward slant sliding surface, and an upward slant sliding surface. The inner valley 713 is positioned at a position closer to the hinge hole 714 than outer valley 712, as outer valley 712 preferably is positioned radially farther away from the hinge hole than the inner valley 713. Preferably, the valley shape of the outer valley 712 is formed to be larger than the inner valley 713. The reason for the preferred size difference is because the curvature of the outer valley 712 is larger than that of the inner valley 713.

Also, the driven sliding cam 70 preferably includes an inner projection part 720 and an outer projection part 722. The inner projection part 720 takes a stepped shape recessed in a direction of the hinge axis, and is formed at a position confronting the inner valley 713. The outer projection part 722 takes a stepped shape recessed in a direction of the hinge axis, and is formed at a position confronting the outer valley 712.

Also, the inner valley 713 is disposed adjacent to the outer projection part 722, and the outer valley 712 is disposed adjacent to the inner projection part 720. The inner projection part 720 confronts the inner valley 713 on the hinge axis at about 180°, and the outer projection part 722 confronts the outer valley 712 on the hinge axis at about 180°. Also, the inner projection part 720 is adjacent to the hinge hole 714, whereas the outer projection part 722 is spaced apart from the hinge hole 714, and the inner valley 713 and the outer projection part 722 confront the inner projection part 720 and the outer valley 712, respectively, on the opposite end of the hinge hole 714. Preferably, an area between the outer valley 712 and the outer projection part 722, specifically, the area contacting the surface of the outer cam 612 (that is, an area in the middle between the outer valley 712 and the outer projection part 722) is further provided with another valley 715 having the same curvature, and an area between the inner valley 713 and the inner projection part 720 is further provided with a protrusion 716 having the same curvature.

In comparison of the shape of the valley with that of the projection part, according to this exemplary embodiment the present invention, since the inner and outer projection parts are provided to provide a stopping force to the folder at 180° and provide a click feeling, the recess depths of the inner and outer projection parts are shallower than those of the inner and outer valleys. Furthermore, the inner and outer valleys have a smooth curved surface in order to have a slidable contact with the surface of the inner and outer cams, while the inner and outer projection parts are not required to be smoothly formed and thereby take a stepped shape. Due to the stepped shape, the inner and outer projection parts can effectively provide the click feeling when moved. The 'click feeling' means a tactile and audible feeling provided by the hinge apparatus during the folder's rotation by a user.

Hereinafter, the mutual camming between the driving actuating cam 60 and the driven sliding cam 70 will now be described.

The driving actuating cam 60 and the driven sliding cam 70 are mounted within the hinge housing while they face each other. Herein, in a state where the mobile terminal is closed, that is, in a state where the folder is unfolded from the main body, the inner and outer cams 613 and 612 are engaged with the inner and outer valleys 713 and 712, respectively. The force provided in this position is a stopping force of the folder. Accordingly, the unfolded state of the folder can be maintained without opening the folder from the main body.

Then, when the folder rotates, the inner and outer cams 613 and 612 disposed to face the inner and outer valleys 713 and 712 cam while performing sliding surface-contact. When the driving actuating cam 60 rotates at 10° or more, the outer cam 612 moves to a sliding flat surface 711 by separating from the outer valley 712, and at the same time the inner cam 613 moves to the sliding flat surface by separating from the inner valley 713.

At the same time, the driven sliding cam 70 moves backward within the hinge housing. In this state, to the folder, a force for maintaining the current position of the folder is provided from the hinge spring instead of a force for rotating the folder. Then, when the driving actuating cam 60 rotates at 180°, the outer cam 612 is positioned at the outer projection part 722, and the inner cam 613 is positioned at the inner projection part 720. Next, when the folder is forcedly rotated at 180° or more, the inner cam 613 and the outer cam 612 perform contact with the sliding flat surface. Also, when the folder is rotated at about 270°, the outer cam 612 is subjected to a stopping force by engaging with another valley 715, and at the same time the protrusion 716 provided in the driven sliding cam is engaged with the inner valley 616 formed in the driving actuating cam.

Finally, the driving actuating cam 60 and the driven sliding cam 70 provide a stopping force to the folder at about 0°, 180°, and 270°, and also provide a maintaining force to some extent to the folder in a rotation at other rotation angles where there is no provision of the stopping force.

Figure 14:
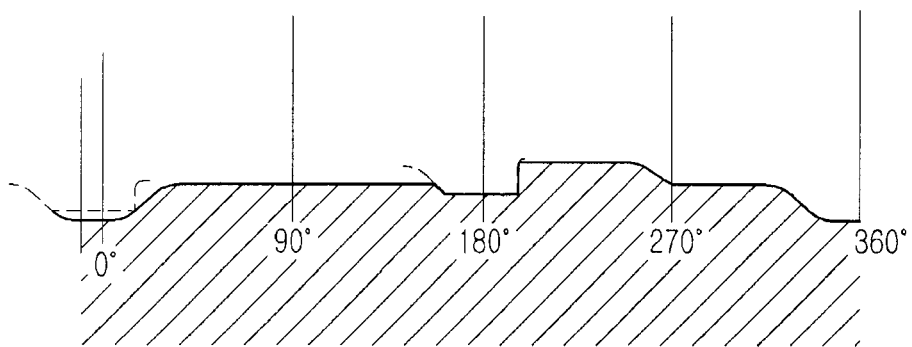
FIG. 14 is a diagram showing a free-stop state providing a click feeling in a mobile terminal employing a hinge module according to a second exemplary embodiment of the present invention, in which the horizontal axis indicates the unfolded state of valley portions, and the vertical axis indicates the rotation angle.

The diagram illustrating the relationship on the open/close operation of the folder provided with the above described driving actuating cam and the driven sliding cam is shown in FIG. 14.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A free-stop hinge apparatus for a folding-type mobile terminal, in which a main body and a folder are rotatably connected to each other on a hinge axis, the free-stop hinge apparatus comprising:
   a rotating driving actuating cam; and
   a driven sliding cam which slides according to a rotation of the driving actuating cam,
   wherein the driving actuating cam has a hinge hole substantially at center thereof extending in a direction of the hinge axis, and an inner cam and an outer cam formed on one surface of a body, and the outer cam opposes the inner cam and is formed in a radial direction at an outer edge of the one surface closer to the outer edge of said one surface than the inner cam, and
   the driven sliding cam has an inner valley and an outer valley, and a hinge hole substantially at a center thereof, the hinge hole extending in a direction of the hinge axis, wherein the inner valley opposes the inner cam and the outer valley opposes the outer cam,
   wherein a camming between the inner cam and outer cam and the inner valley and outer valley provides a stopping force at angles of 0~10°, and 350~360° of an opening/closing operation of the folder, and which provides a stopping force at 180° and about 270 degrees during an opening/closing operation of the folder by an inner projection part having a stepped shape and being recessed in a direction of the hinge axis and being formed at a position opposing the inner valley, and an outer projection part having a stepped shape and is recessed in a direction of the hinge axis, and is formed at a position opposing the outer valley, and
   where the free-stop hinge apparatus provides a maintaining force that is less than the stopping force at other rotation angles where there is no provision of the stopping force, in which the maintaining force maintains a current position.

2. The free-stop hinge apparatus as claimed in claim 1, wherein the inner cam is adjacent the hinge hole, and the outer cam is spaced further apart from the hinge hole than the inner cam.

3. The free-stop hinge apparatus as claimed in claim 1, wherein the inner cam opposes the outer cam and is spaced apart from the outer cam at substantially 180° on an opposite end of the hinge hole of the driving actuating cam, and the inner valley opposes the outer valley and is spaced apart from the outer valley at substantially 180° on an opposite end of the hinge hole of the driven sliding cam.

4. A free-stop hinge apparatus for a folding-type mobile terminal, in which a main body and a folder are rotatably connected to each other on a hinge axis, the free-stop hinge apparatus comprising:
  a hinge housing;
  a driving part for providing a free-stop operation, in which said driving part is received in the hinge housing; and
  a hinge shaft for restraining the driving part in the hinge housing,
  wherein the driving part comprises a rotating driving actuating cam and a driven sliding cam that slidably moves within the hinge housing while performing a cam-motion with the driving actuating cam as the driving actuating cam rotates according to rotation of the folder,
  wherein the driving actuating cam comprises an inner cam formed on one surface of a body, and an outer cam which faces the inner cam and is formed at an outer edge of said one surface in a radial direction from the inner cam and closer to the outer edge of said one surface than the inner cam, and
  the driven sliding cam comprises an inner valley which is slidably disposed to face the inner cam of the driving actuating cam and slides together with the inner cam, and an outer valley which is slidably disposed to face the outer cam of the driving actuating cam and slides together with the outer cam;
  wherein a camming between the inner cam and outer cam and the inner valley and outer valley provides a stopping force at angles of 0~10°, and 350~360° of an opening/closing operation of the folder, and provides a maintaining force that is less than the stopping force at other rotation angles where there is no provision of the stopping force, in which the maintaining force maintains a current position, and
  wherein the hinge apparatus provides a tactile and audible feedback during a rotation of the folder, and
  wherein an inner projection part has a stepped shape and is recessed in a direction of the hinge axis and is formed at a position opposing the inner valley, and an outer projection part has a stepped shape and is recessed in a direction of the hinge axis, and is formed at a position opposing the outer valley, which provides a stopping force at 180 degrees and about 270 degrees during an opening/closing operation of the folder.

5. The free-stop hinge apparatus as claimed in claim 4, wherein the inner cam of the driving actuating cam opposes and is spaced apart from the outer cam at substantially 180° on the hinge axis of the driving actuating cam, and the inner valley opposes and is spaced apart from the outer valley at substantially 180° on the hinge axis.

6. The free-stop hinge apparatus as claimed in claim 4, wherein the inner cam has a curvature smaller than the outer cam.

7. The free-stop hinge apparatus as claimed in claim 4, wherein the inner cam and the outer cam protrude in a mountain-shape from said one surface of the body of the driving actuating cam in a direction of the hinge axis, and the inner valley and the outer valley are recessed in a mountain-shape from one surface of a body of the driven sliding cam corresponding to the mountain shape protrusion of the inner cam and outer cam and in a direction of the hinge axis.

8. The free-stop hinge apparatus as claimed in claim 4, wherein the inner cam is adjacent to a hinge hole, and the outer cam is spaced further apart from the hinge hole than the inner cam.

9. The free-stop hinge apparatus as claimed in claim 4, wherein each of the inner cam and the outer cam comprises a slant sliding surface, and a flat surface is formed between the inner cam and the outer cam.

10. The free-stop hinge apparatus as claimed in claim 4, wherein a stopping force from the hinge apparatus is not provided to the folder except at 0° and 360° positions.

11. A free-stop hinge apparatus for a folding-type mobile terminal, in which a main body and a folder are rotatably connected to each other on a hinge axis, the free-stop hinge apparatus comprising:
  a rotating driving actuating cam; and
  a driven sliding cam that slidably moves within the hinge housing while performing a cam-motion with the driving actuating cam as the driving actuating cam rotates according to rotation of the folder,
  wherein the driving actuating cam comprises an inner cam formed on one surface of a body, and an outer cam which opposes the inner cam and is formed at an outer edge of said one body at a position closer to the outer edge of said one surface than the inner cam in a radial direction, and
  the driven sliding cam comprises an inner valley which is slidably disposed to face the inner cam of the driving actuating cam and slides together with the inner cam, an outer valley which is disposed to face the outer cam of the driving actuating cam and slides together with the outer cam, an inner projection part which takes a stepped shape recessed in a direction of the hinge axis and is formed at a position opposing the inner valley, and an outer projection part which takes a stepped shape recessed in a direction of the hinge axis, and is formed at a position opposing the outer valley,
  wherein the driven sliding cam has a hinge hole extending in a direction of the hinge axis in which the inner projection part is adjacent to the hinge hole, the outer projection part is spaced apart from the hinge hole, and the inner valley and the outer projection part oppose the inner projection part and the outer valley on an opposite side of the hinge hole,
  wherein a camming between the inner cam and outer cam and the inner valley and outer valley provides a stopping force at angles of 0~10°, and 350~360° of an opening/closing operation of the folder, and which also provides a stopping force at 180° and about 270 degrees during the opening/closing operation of the folder in which an inner projection part has a stepped shaped and is recessed in a direction of the hinge axis and is formed at a position opposing the inner valley, and an outer projection part has a stepped shape and is recessed in a direction of the hinge axis, and is formed at a position opposing the outer valley, where the free-stop hinge apparatus provides a maintaining force that is less than the stopping force at other rotation angles where there is no provision of the stopping force, in which the maintaining force maintains a current position; and
  wherein the inner and outer projection parts provides a tactile and an audible feedback during a rotation of the folder.

12. The free-stop hinge apparatus as claimed in claim 11, wherein the inner valley is disposed adjacent the outer projection part, and the outer valley is disposed adjacent the inner projection part.

13. The free-stop hinge apparatus as claimed in claim 11, wherein the inner projection part opposes the inner valley on the hinge axis at about 180°, and the outer projection part opposes the outer valley on the hinge axis at about 180°.

14. The free-stop hinge apparatus as claimed in claim 11, wherein an additional valley having a same curvature as the outer valley and the outer projection part is further formed between the outer valley and the outer projection part, and a protrusion having a corresponding curvature as the inner valley and the inner projection part is further formed between the inner valley and the inner projection part.

15. The free-stop hinge apparatus as claimed in claim 11, wherein the driving actuating cam further comprises an additional inner valley in a curvature area included in rotation of the inner cam, and an additional outer valley in a curvature area included in rotation of the outer cam.

16. The free-stop hinge apparatus as claimed in claim 11, wherein the driving actuating cam and the driven sliding cam are arranged to cam together in a state where their cam surfaces face each other to support the folder in a stopped state at positions of about 0°, 180°, and 270°.

* * * * *